(12) United States Patent
Song et al.

(10) Patent No.: US 10,776,116 B2
(45) Date of Patent: Sep. 15, 2020

(54) INSTRUCTION TRANSLATION CIRCUIT, PROCESSOR CIRCUIT AND EXECUTING METHOD THEREOF

(71) Applicant: Shanghai Zhaoxin Semiconductor Co., Ltd., Shanghai (CN)

(72) Inventors: Chenchen Song, Beijing (CN); Xiaolong Fei, Beijing (CN); Aimin Ling, Beijing (CN); Yingbing Guan, Beijing (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 53 days.

(21) Appl. No.: 16/105,975

(22) Filed: Aug. 21, 2018

(65) Prior Publication Data

US 2019/0384599 A1 Dec. 19, 2019

(30) Foreign Application Priority Data

Jun. 15, 2018 (CN) .......................... 2018 1 0618308

(51) Int. Cl.
*G06F 9/30* (2018.01)
(52) U.S. Cl.
CPC ........ *G06F 9/3017* (2013.01); *G06F 9/30181* (2013.01)
(58) Field of Classification Search
CPC ....................................................... G06F 9/38
See application file for complete search history.

(56) References Cited

U.S. PATENT DOCUMENTS

| 4,463,421 | A | * | 7/1984 | Laws | ...................... | G06F 13/38 |
| | | | | | | 710/46 |
| 5,404,560 | A | * | 4/1995 | Lee | .......................... | G06F 9/28 |
| | | | | | | 712/208 |

(Continued)

FOREIGN PATENT DOCUMENTS

CN 101866279 10/2010

OTHER PUBLICATIONS

"Office Action of China Counterpart Application", dated Mar. 20, 2020, p. 1-p. 8.

*Primary Examiner* — Cheng Yuan Tseng
(74) *Attorney, Agent, or Firm* — JCIPRNET

(57) ABSTRACT

An instruction translation circuit, a processor circuit, and an executing method thereof are provided. The instruction translation circuit is adapted for being disposed in the processor circuit. The instruction translation circuit includes a formatted instruction queue, a first instruction translator, an instruction detection circuit, and a second instruction translator. The formatted instruction queue stores a plurality of formatted macro instructions. The first instruction translator translates a first formatted macro instruction of the formatted macro instructions and outputs a first micro instruction. When the instruction detection circuit determines that a trap bit in the first formatted macro instruction is set and a part of the first formatted macro instruction can be translated in advance, the instruction detection circuit outputs first trap information. The second instruction translator translates the part of the first formatted macro instruction in advance according to the first trap information to output a second micro instruction.

18 Claims, 3 Drawing Sheets

(56) References Cited

U.S. PATENT DOCUMENTS

| | | | | |
|---|---|---|---|---|
| 5,729,728 | A * | 3/1998 | Colwell | G06F 9/322 |
| | | | | 712/218 |
| 5,774,711 | A * | 6/1998 | Henry | G06F 9/30032 |
| | | | | 712/241 |
| 7,263,599 | B2 * | 8/2007 | Norden | G06F 9/3802 |
| | | | | 712/205 |
| 7,360,203 | B2 * | 4/2008 | Ober | G06F 9/3824 |
| | | | | 712/E9.046 |
| 7,454,598 | B2 * | 11/2008 | Hastie | G06F 9/3836 |
| | | | | 712/216 |
| 9,207,940 | B2 * | 12/2015 | Patel | G06F 9/30145 |
| 10,409,763 | B2 * | 9/2019 | Lai | G06F 9/3832 |
| 2011/0040953 | A1 | 2/2011 | Parks | |

* cited by examiner

INSTRUCTION TRANSLATION CIRCUIT, PROCESSOR CIRCUIT AND EXECUTING METHOD THEREOF

CROSS-REFERENCE TO RELATED APPLICATION

This application claims the priority benefit of China application serial no. 201810618308.0, filed on Jun. 15, 2018. The entirety of the above-mentioned patent application is hereby incorporated by reference herein and made a part of this specification.

BACKGROUND

Technical Field

The invention relates to a translation technology of a complex instruction. More particularly, the invention relates to an instruction translation circuit, a processor circuit, and an executing method thereof.

Description of Related Art

In general, in a conventional processor implementing the x86 architecture, when a formatted instruction queue (FIQ) provides a formatted macro instruction to an instruction translator (XLATE), if the formatted macro instruction is a complex instruction, a trap bit detector can further provide trap bit information to a microcode/ucode translator only after the instruction translator finishes instruction translation (in some cases, the trap bit information is required to be provided to a register alias table first and is further provided to the microcode translator by the register alias table). In this way, the microcode translator can further perform instruction translation according to the trap bit information. That is, the microcode translator has to wait for the instruction translator to complete instruction translation of a part of the formatted macro instruction before performing instruction translation to another part of the formatted macro instruction. Hence, in the conventional processor implementing the x86 architecture, since translation of a complex instruction is time consuming, the processor is unable to deliver favorable executing efficiency. In view of the above, several solutions are provided as follows.

SUMMARY

The invention provides an instruction translation circuit, a processor circuit, and an executing method thereof in which a part of a formatted macro instruction is translated in advance so as to effectively increase executing efficiency of a processor.

An instruction translation circuit provided by an embodiment of the invention is adapted for being disposed in a processor circuit. The instruction translation circuit includes a formatted instruction queue, a first instruction translator, an instruction detection circuit, and a second instruction translator. The formatted instruction queue is configured to store a plurality of formatted macro instructions. The first instruction translator is coupled to the formatted instruction queue. The first instruction translator is configured to translate a first formatted macro instruction of the formatted macro instructions and outputs a first micro instruction. The instruction detection circuit is coupled to the formatted instruction queue. When the instruction detection circuit determines that a trap bit in the first formatted macro instruction of the formatted macro instructions is set and a part of the first formatted macro instruction can be translated in advance, the instruction detection circuit outputs first trap information. The second instruction translator is coupled to the instruction detection circuit. The second instruction translator is configured to translate the part of the first formatted macro instruction in advance according to the first trap information to output a second micro instruction.

A processor circuit provided by an embodiment of the invention includes an instruction translation circuit and a register alias table. The instruction translation circuit includes a formatted instruction queue, a first instruction translator, an instruction detection circuit, and a second instruction translator. The formatted instruction queue is configured to store a plurality of formatted macro instructions. The first instruction translator is coupled to the formatted instruction queue. The first instruction translator is configured to translate a first formatted macro instruction of the formatted macro instructions and outputs a first micro instruction. The instruction detection circuit is coupled to the formatted instruction queue. When the instruction detection circuit determines that a trap bit in the first formatted macro instruction of the formatted macro instructions is set and a part of the first formatted macro instruction can be translated in advance, the instruction detection circuit outputs first trap information. The second instruction translator is coupled to the instruction detection circuit. The second instruction translator is configured to translate the part of the first formatted macro instruction in advance according to the first trap information to output a second micro instruction. The register alias table is coupled to the first instruction translator and the second instruction translator. The register alias table is configured to receive the first micro instruction and the second micro instruction.

An executing method provided by an embodiment of the invention is adapted for an instruction translation circuit. The executing method includes the following steps. A plurality of formatted macro instructions is stored through a formatted instruction queue. When a trap bit in a first formatted macro instruction of the formatted macro instructions is set and a part of the first formatted macro instruction can be translated in advance, first trap information is outputted through an instruction detection circuit. The part of the first formatted macro instruction is translated in advance through the second instruction translator according to the first trap information to output a second micro instruction. Another part of the first formatted macro instruction is translated through a first instruction translator, and a first micro instruction is outputted.

To sum up, in the instruction translation circuit, the processor circuit, and the executing method thereof provided by the invention, whether the more complex part of the first formatted macro instruction of the formatted macro instructions stored in the formatted instruction queue can be translated in advance is determined in advance through the instruction detection circuit. In this way, the more complex part of the first formatted macro instruction may be translated in advance through the second instruction translator. Therefore, in the instruction translation circuit, the processor circuit, and the executing method thereof provided by the invention, the speed of executing instructions by the processor circuit may be effectively accelerated, and processor idleness is also effectively reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
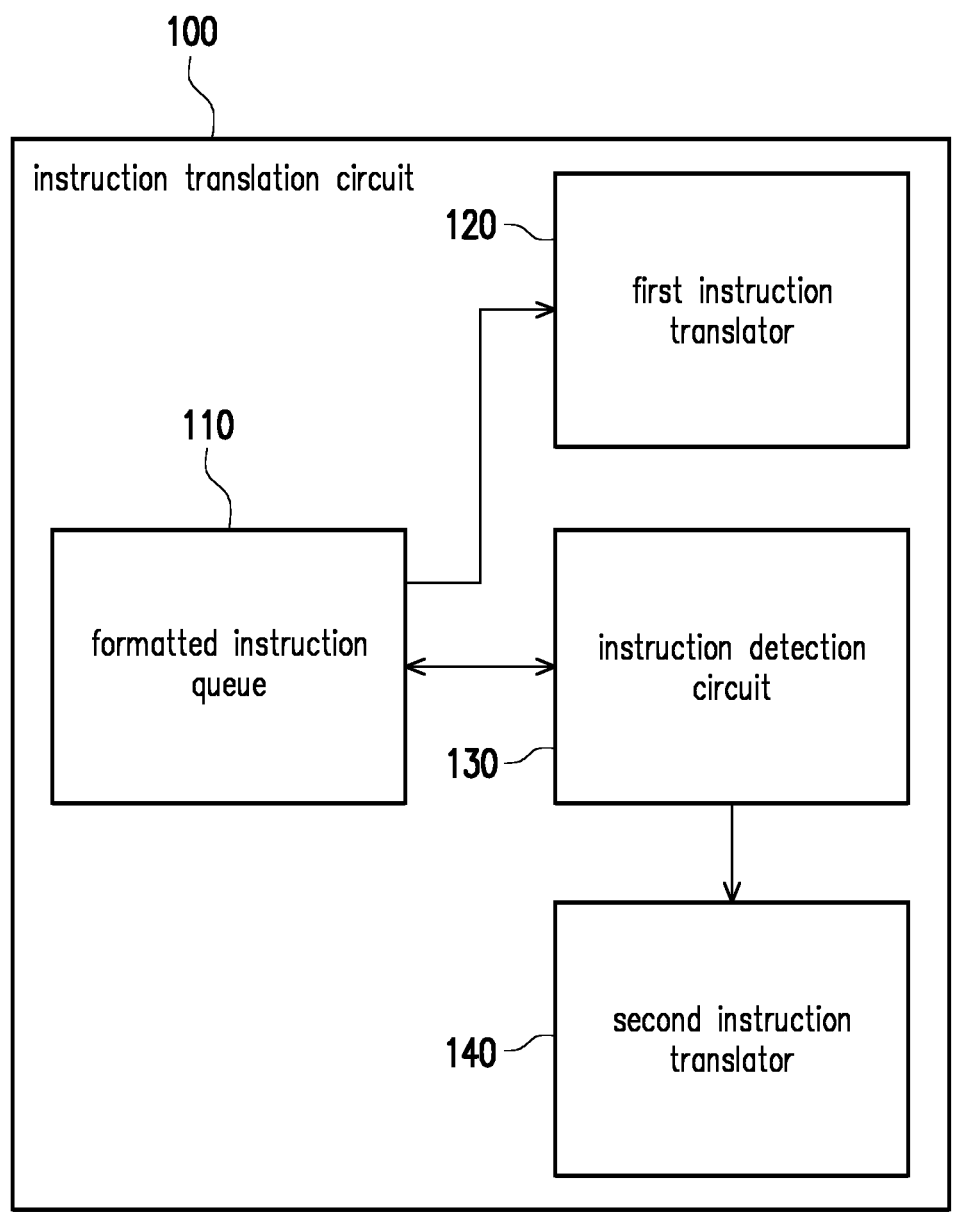
FIG. 1 is a schematic diagram of an instruction translation circuit according to an embodiment of the invention.

In order to make this disclosure more comprehensible, several embodiments are described below as examples of implementation of this disclosure. Moreover, elements/components/steps with the same reference numerals are used to represent the same or similar parts in the drawings and embodiments where appropriate.

FIG. 1 is a schematic diagram of an instruction translation circuit according to an embodiment of the invention. With reference to FIG. 1, an instruction translation circuit 100 includes a formatted instruction queue (FIQ) 110, a first instruction translator 120, an instruction detection circuit 130, and a second instruction translator 140. The formatted instruction queue 110 is coupled to the first instruction translator 120 and the instruction detection circuit 130. The instruction detection circuit 130 is coupled to the second instruction translator 140. In this embodiment, the processor circuit 100 is a superscalar pipeline (out-of-order execution) processor (an ambitious central processing unit) having an instruction pipeline, but the invention is not limited thereto. In an embodiment, the processor circuit 100, for example, is a microprocessor of any type, a central processing unit (CPU), a microcontroller unit (MCU), or other similar processing units. Alternatively, the processor circuit 100 includes a processor configuration of any type, such as a processing unit integrated on a chip or an integrated circuit (IC) integrated in a system on chip (SOC).

In this embodiment, the instruction translation circuit 100 is adapted for being disposed in the processor circuit and is configured to provide instruction translation (also known as decoding). For instance, when a processor executes an instruction, the instruction translation circuit 100 receives and stores formatted macro instructions provided by an instruction cache (not shown) and outputs translated micro instructions to a register alias table (RAT) (not shown). After processing the micro instructions, the register alias table then issues the micro instructions to the back end of the processor for performing operations such as scheduling, dispatching, executing, and the like. Note that the micro instruction is also called as micro-operation (top). In this embodiment, the formatted instruction queue 110 is configured to store a plurality of formatted macro instructions provided by the instruction cache (not shown). The formatted macro instructions, for example, are macro instructions implementing the x86 instruction set architecture. The formatted macro instructions, for example, include an operation code Opcode, ModRM, an instruction type, a trap bit, trap information, instruction content (information content inclusion relation) information, abnormal information, an immediate value, branch prediction related information, instruction address related information, displacement, and the like. Nevertheless, the invention is not limited thereto.

In this embodiment, the formatted macro instructions may be divided into complex instructions and non-complex instructions. A non-complex instruction refers to the formatted macro instruction whose instruction translation is only required to be performed through the first instruction translator 120 so that the corresponding micro instruction could be obtained. A complex instruction refers to the formatted macro instruction in which not only a part (an easier part) of the formatted macro instruction is required to be translated through the first instruction translator 120 but also another part (a more complex part) of the formatted macro instruction is required to be translated through the second instruction translator 140. In an embodiment, the second instruction translator 140 is a microcode/ucode translator which translates the another part of the formatted macro instruction into a plurality of micro instructions through microcode translation. Nevertheless, the formatted macro instructions belonging to the complex instructions may be further divided into instruction types which can be translated in advance and which cannot be translated in advance. Therefore, in this embodiment, the instruction translation circuit 100 determines whether the formatted macro instructions are the complex instructions in advance through the instruction detection circuit 130 and further determines whether the formatted macro instructions can be translated in advance through the instruction detection circuit 130.

In this embodiment, the formatted instruction queue 110, for example, stores the formatted macro instructions, and the first instruction translator 120 reads the formatted macro instructions in sequence for performing instruction translation. In this embodiment, the first instruction translator 120 may read several formatted macro instructions, for example, 2, 3, or 5 formatted macro instructions (hereinafter, a first formatted macro instruction or a second formatted macro instruction) in parallel for performing translation, which is not limited by the invention. In this embodiment, a number of instructions translated by the first instruction translator 120 in one machine cycle can be determined according to different processor types or design. In this embodiment, when the first instruction translator 120 performs instruction translation, the instruction detection circuit 130 can simultaneously detect the rest of the formatted macro instructions in the formatted instruction queue 110 in sequence, so as to determine whether the complex instruction requiring further translation through the second instruction translator 140 is included in the rest of the formatted macro instructions.

To be specific, when the instruction detection circuit 130 determines that a trap bit in the first formatted macro instruction is set and a part of the first formatted macro instruction can be translated in advance, the instruction detection circuit 130 outputs first trap information. The second instruction translator 140 translates the part of the first formatted macro instruction in advance according to the first trap information to generate a second micro instruction. In this embodiment, in the formatted macro instructions stored in the formatted instruction queue 110, when the instruction detection circuit 130 detects an oldest (the "oldest" refers to entering the formatted instruction queue 110 earliest) formatted macro instruction among the formatted macro instructions requiring further translation through the second instruction translator 140, the instruction detection circuit 130 regards the oldest formatted macro instruction requiring further translation as the first formatted macro instruction. The instruction detection circuit 130 further determines whether a part (a more complex part) of this first formatted macro instruction can be translated in advance.

Note that in an embodiment, if the trap bit in the formatted macro instructions trap bit is set, it means that further translation is required to be performed through the second instruction translator 140. Moreover, if the part of the first formatted macro instruction can be translated in advance, the instruction detection circuit 130 provides trap information of this first formatted macro instruction to the second instruction translator 140. In this way, the second instruction translator 140 performs instruction translation according to the trap information and outputs a plurality of micro instructions corresponding to the complex part of the first formatted macro instruction. Nevertheless, when the first instruction translator 120 reads the first formatted macro instruction in sequence, the first instruction translator 120 translates the first formatted macro instruction and generates a micro instruction of a part of the first formatted macro instruction in which microcode translation is not required to be performed (i.e., translation provided by the second instruction translator 140 is not required). That is, in this embodiment, the second instruction translator 140 can translate the first formatted macro instruction prior to the first instruction translator 120. In this case, a machine cycle when the second instruction translator 140 outputs the micro instruction is earlier than a machine cycle when the first instruction translator 120 outputs the micro instruction. Moreover, the micro instruction outputted by the first instruction translator 120 and the micro instruction outputted by the second instruction translator 140 can be integrated into a complete micro instruction corresponding to the formatted macro instructions. In terms of an instruction order, the micro instruction outputted by the first instruction translator 120 is located ahead of the micro instruction outputted by the second instruction translator 140.

Figure 2:
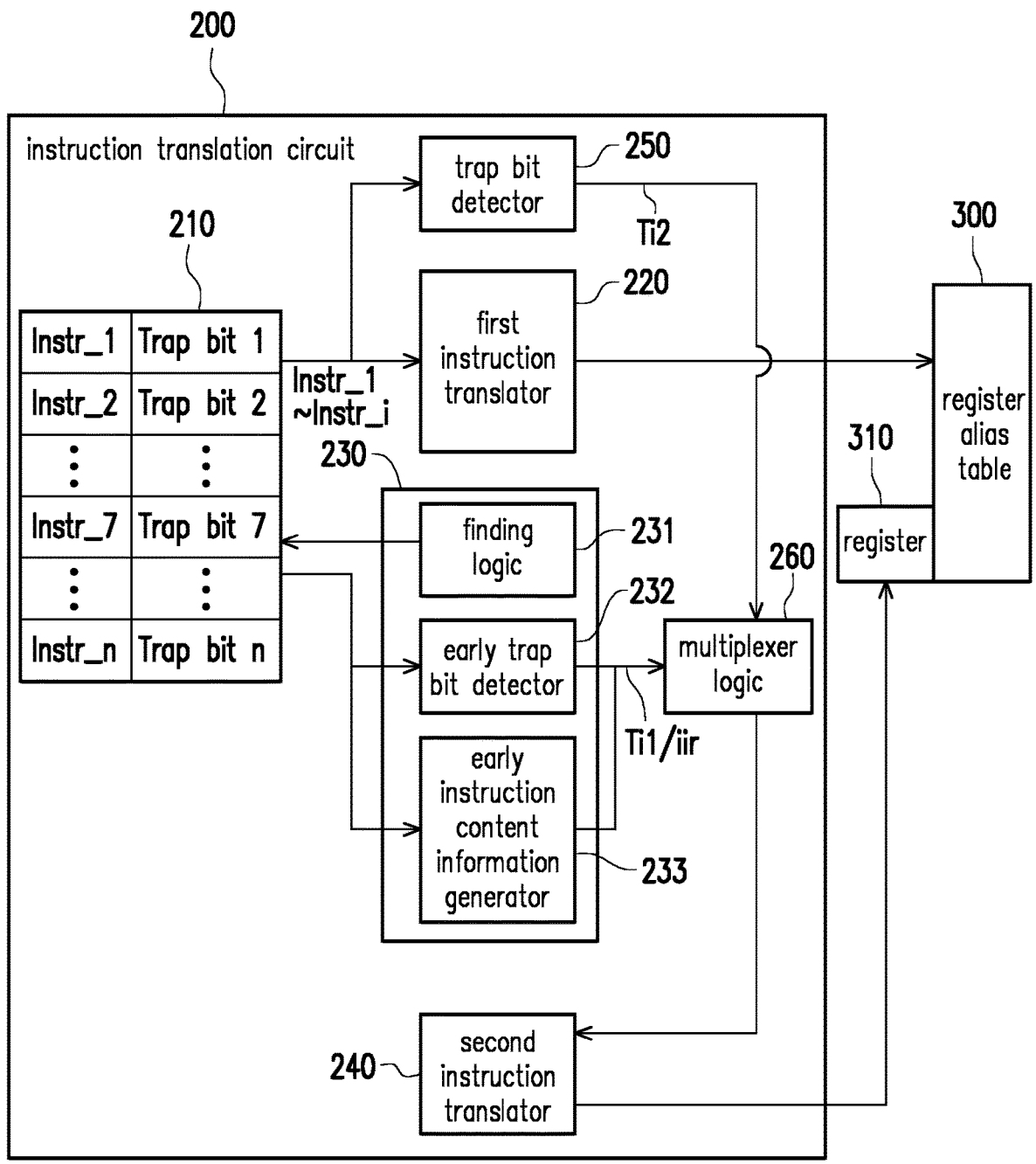
FIG. 2 is a schematic diagram of a processor circuit according to an embodiment of the invention.

FIG. 2 is a schematic diagram of a processor circuit according to an embodiment of the invention. With reference to FIG. 2, a processor circuit 20 of this embodiment includes an instruction translation circuit 200 and a register alias table 300. The instruction translation circuit 200 includes a formatted instruction queue 210, a first instruction translator 220, an instruction detection circuit 230, a second instruction translator 240, a trap bit detector 250, and a multiplexer logic 260. The register alias table 300 includes a register 310. The instruction detection circuit 230 includes a finding logic 231, an early trap bit detector 232, and an early instruction content information generator 233. In this embodiment, the formatted instruction queue 210 is coupled to the first instruction translator 220, the instruction detection circuit 230, and the trap bit detector 250. The multiplexer logic 260 is coupled to the instruction detection circuit 230, the second instruction translator 240, and the trap bit detector 250. The register alias table 300 is coupled to the first instruction translator 220 and the second instruction translator 240.

In this embodiment, the formatted instruction queue 210 stores a plurality of formatted macro instructions Instr_1 to Instr_n in sequence. Each of the formatted macro instructions Instr_1 to Instr_n has a corresponding trap bit of trap bits trap bit 1 to trap bit n. In this embodiment, if a normal macro instruction is provided, a corresponding trap bit is not to be set (e.g., set to 0). If a complex macro instruction requiring further microcode translation through the second instruction translator 240 is provided, a corresponding trap bit is set (e.g., set to 1).

For instance, the first instruction translator 220 reads one or multiple formatted macro instructions Instr_1 to Instr_i in the formatted instruction queue 210 in sequence and outputs one or multiple corresponding first micro instructions to the register alias table 300, wherein i is a positive integer greater than 1. A number i of the formatted macro instructions Instr_1 to Instr_i read by the first instruction translator 220 is a number of macro instructions which can be translated in parallel by a processor and is determined according to the structural design of the processor. In this embodiment, the trap bit detector 250 detects whether the trap bits of the formatted macro instructions Instr_1 to Instr_i are set and provides the trap information to the multiplexer logic 260 a certain number of machine cycles later after the first instruction translator 220 finishes performing instruction translation (e.g., 2 machine cycles later after the first instruction translator 220 finishes performing instruction translation). Nevertheless, in this embodiment, when the first instruction translator 220 performs instruction translation to the formatted macro instructions Instr_1 to Instr_i, the finding logic 231 simultaneously detects the rest of the formatted macro instructions Instr_(i+1) to Instr_n in the formatted instruction queue 210, so as to detect whether a specific formatted macro instruction which requires instruction translation of the complex part through the second instruction translator 240 and meanwhile can be translated in advance is existing.

For another example, when the first instruction translator 220 translates the formatted macro instructions Instr_1 to Instr_3 (the instruction number i indicating the number of the instructions which can be translated in parallel is exemplified as being 3, but the invention is not limited thereto), if the finding logic 231 detects that a first formatted macro instruction Instr_7 (the formatted macro instruction Instr_7 is taken as an example only, and the invention is not limited thereto) enters the formatted instruction queue 210 earliest (i.e., makes the earliest entry into the formatted instruction queue 210) among the formatted macro instructions with the trap bits being set, the early trap bit detector 232 further determines whether a part of the first formatted macro instruction Instr_7 can be translated in advance according to whether the first formatted macro instruction Instr_7 belongs to a specific instruction type or according to whether a trap address of this first formatted macro instruction Instr_7 can be translated in advance.

Note that the formatted macro instructions in the formatted instruction queue 210 follow the principle of first-in and first-out. The formatted macro instruction entering into the formatted instruction queue 210 earlier (i.e., is older) is popped off the formatted instruction queue 210 earlier for being processed. Hence, in this exemplary embodiment, when the finding logic 231 determines that the part of the first formatted macro instruction Instr_7 can be translated in advance, the early trap bit detector 232 outputs first trap information Ti1 of the first formatted macro instruction Instr_7 to the multiplexer logic 260. Moreover, in an embodiment, the early instruction content information generator 233 outputs first instruction content information iir of the first formatted macro instruction Instr_7 to the multiplexer logic 260.

In this exemplary embodiment, if the early trap bit detector 232 determines that the part of the first formatted macro instruction Instr_7 can be translated in advance, the multiplexer logic 260 determines whether the second instruction translator 240 is in an idle state, so as to provide the first trap information Ti1 and the first instruction content information iir to the second instruction translator 240. The second instruction translator 240 generates at least one second micro instruction according to the first trap information Ti1 and the first instruction content information iir. Moreover, the second instruction translator 240 temporarily stores the second micro instruction into the register 310 until the first instruction translator 220 provides the first micro instruction corresponding to the first formatted macro instruction Instr_7 to the register alias table 300. Note that in this exemplary embodiment, the register 310 can be disposed in the register alias table 300, but the invention is not limited thereto. In this exemplary embodiment, the register alias table 300 may integrate the first micro instruction and the second micro instruction into a complete micro instruction corresponding to the first formatted macro instruction Instr_7 and store the complete micro instruction. In this way, the first micro instruction is located ahead of the second micro instruction in terms of the instruction order.

In this exemplary embodiment, when processing the first formatted macro instruction Instr_7, the first instruction translator 220 translates the first formatted macro instruction Instr_7 to generate the first micro instruction. Next, the trap bit detector 250 outputs third trap information for the first formatted macro instruction Instr_7. Now, if an early trap indication signal corresponding to the first formatted macro instruction Instr_7 is determined to be set, it indicates that the first formatted macro instruction Instr_7 has been translated by the second instruction translator 240 in advance, and the register alias table 300 is instructed by the trap bit detector 250 to retrieve the second micro instruction from the register 310.

In this exemplary embodiment, a machine cycle when the trap bit detector 250 outputs the third trap information for the first formatted macro instruction Instr_7 may be later than a machine cycle when the first instruction translator 220 outputs the first micro instruction, for example, 2 machine cycles later. Nevertheless, in the prior art, the third trap information is required to be generated by the trap bit detector 250 before being outputted to the second instruction translator 240 (or the third trap information is even required to be outputted to the register alias table 300 first and then transferred to the second instruction translator 240 by the register alias table 300). Further, since translation of the complex part is time consuming, the time for obtaining the second micro instruction may be approximately 4 machine cycles later after the second instruction translator 240 receives the third trap information. In this regard, in this embodiment, after the trap bit detector 250 outputs the third trap information for the first formatted macro instruction Instr_7, the instruction translation circuit 200 could immediately retrieve the second micro instruction translated in advance from the register 310. Therefore, translation efficiency of the formatted macro instructions can be effective enhanced by the instruction translation circuit 200 of this embodiment. In addition, in another embodiment, the early trap indication signal is set when the second instruction translator 240 receives the first trap information Ti1 and begins to translate the first formatted macro instruction Instr_7 and is cleared after the trap bit detector 250 processes the first formatted macro instruction Instr_7.

On the contrary, in this exemplary embodiment, if the early trap bit detector 232 determines that the part of the first formatted macro instruction Instr_7 cannot be translated in advance (note that although the trap bit of the first formatted macro instruction Instr_7 is set to indicate that early translation is required, the first formatted macro instruction Instr_7 may belong to the formatted macro instruction which cannot be translated in advance (e.g., the early trap bit detector 232 determines that the first formatted macro instruction Instr_7 does not belong to any specific instruction type or the trap address of the first formatted macro instruction Instr_7 cannot be translated in advance, it is determined that the complex part of the first formatted macro instruction Instr_7 cannot be translated in advance)), the finding logic 231 stops searching the formatted macro instructions Instr_1 to Instr_n stored in the formatted instruction queue 210 so as to be maintained to point to the first formatted macro instruction Instr_7. Then, when the first instruction translator 220 translates the formatted macro instruction Instr_7 in sequence, if the trap bit detector 250 detects that the trap bit in the formatted macro instruction Instr_7 is set, the trap bit detector 250 outputs third trap information Ti3 (not shown) to the multiplexer logic 260 after the first instruction translator 220 generates the first micro instruction.

In this exemplary embodiment, since the first formatted macro instruction Instr_7 is not translated in advance through the second instruction translator 250, the corresponding early trap indication signal thereof is not set. If the multiplexer logic 260 determines that the early trap indication signal corresponding to the first formatted macro instruction Instr_7 is not set, the multiplexer logic 260 outputs the third trap information Ti3 to the second instruction translator 240. As such, the second instruction translator 240 generates the second micro instruction according to the third trap information Ti3 and corresponding instruction content information. The register alias table 300 integrates the first micro instruction and the second micro instruction into the complete micro instruction. Further, the finding logic 231 continues to search the formatted macro instructions Instr_1 to Instr_n stored in the formatted instruction queue 210. Note that the second micro instruction refers to the complex instruction which requires further instruction translation to be performed to the first formatted macro instruction Instr_7 through the second instruction translator 240 but cannot be translated in advance. Hence, in such a case, the second micro instruction is generated by the second instruction translator 240 according to the third trap information Ti3 and the corresponding instruction content information provided by the trap bit detector 250 (or provided by the register alias table 300).

That is, in this embodiment, the instruction translation circuit 200 may translate the formatted macro instructions Instr_1 to Instr_n stored in the formatted instruction queue 210 through the first instruction translator 220 in sequence. Further, if at least one of the formatted macro instructions Instr_1 to Instr_n is the complex instruction, the trap bit of the complex instruction is set (e.g., set to 1) in one embodiment. When the instruction detection circuit 230 determines that the trap bit of one of the formatted macro instructions is set (i.e., the formatted macro instruction is determined to be the complex instruction) and a part of the formatted macro instruction can be translated in advance (e.g., the formatted macro instruction belongs to a specific instruction type or a trap address of the formatted macro instruction may be obtained in advance), the instruction translation circuit 200 may translate the complex instruction in advance through the second instruction translator 240 and temporarily stores a translation result into the register 310. In other words, when the complex instruction is translated by the first instruction translator 220, the first instruction translator 220 is not required to wait for the second instruction translator 240 because the translation result provided by the second instruction translator 240 has been temporarily stored into the register 310. When translation performed by the first instruction translator 220 is completed, the complete micro instruction is obtained by the register alias table 300 immediately. Therefore, in this embodiment, instruction translation can be effectively performed by the processor circuit 200 and processor idleness is also effectively reduced.

The following describes a working principle in which the multiplexer logic 260 may simultaneously receive 2 pieces of trap information in an embodiment. When the instruction detection circuit 230 described above processes the first formatted macro instruction Instr_7, the first instruction translator 220 is processing the second formatted macro instruction (e.g., a second formatted macro instruction Instr_3) in the formatted macro instructions Instr_1 to Instr_i at the same time. The trap bit of the second formatted macro instruction Instr_3 is also set and the second formatted macro instruction Instr_3 is older than the first formatted macro instruction Instr_7 in terms of the order in the formatted instruction queue 210. Hence, when the trap bit detector 250 detects that the trap bit in the second formatted macro instruction Instr_3 is set, the trap bit detector 250 outputs second trap information Ti2 of the second formatted macro instruction Instr_3. Further, when the multiplexer logic 260 simultaneously receives the first trap information Ti1 of first formatted macro instruction Instr_7 outputted by the instruction detection circuit 230 and the second trap information Ti2 of the second formatted macro instruction Instr_3 outputted by the trap bit detector 250, the multiplexer logic 260 determines whether an early trap indication signal corresponding to the second formatted macro instruction Instr_3 is set, so as to determine whether the second formatted macro instruction Instr_3 is translated in advance.

In this embodiment, if the early trap indication signal corresponding to the second formatted macro instruction Instr_3 is not set, the multiplexer logic 260 outputs the second trap information Ti2 to the second instruction translator 240. In this way, the second instruction translator 240 generates a third micro instruction corresponding to the second formatted macro instruction Instr_3 according to the second trap information Ti2 and the multiplexer logic 260 deletes the first trap information Ti1 of the first formatted macro instruction Instr_7 received from the instruction detection circuit 230. In this embodiment, if the early trap indication signal corresponding to the second formatted macro instruction Instr_3 is set, the multiplexer logic 260 outputs the first trap information Ti1 of the first formatted macro instruction Instr_7 to the second instruction translator 240. In this way, the second instruction translator 240 generates the second micro instruction corresponding to the first formatted macro instruction Instr_7 according to the first trap information Ti1 when being idle. That is, for the second instruction translator 240, a priority level of normal translation operation of the second formatted macro instruction Instr_3 sent by the trap bit detector 250 is higher than a priority level of early translation operation of the first formatted macro instruction Instr_7 sent by the instruction detection circuit 230. The priority level of normal translation operation and the priority level of early translation operation may be implemented through the selection operation performed by the multiplexer logic 260.

Figure 3:
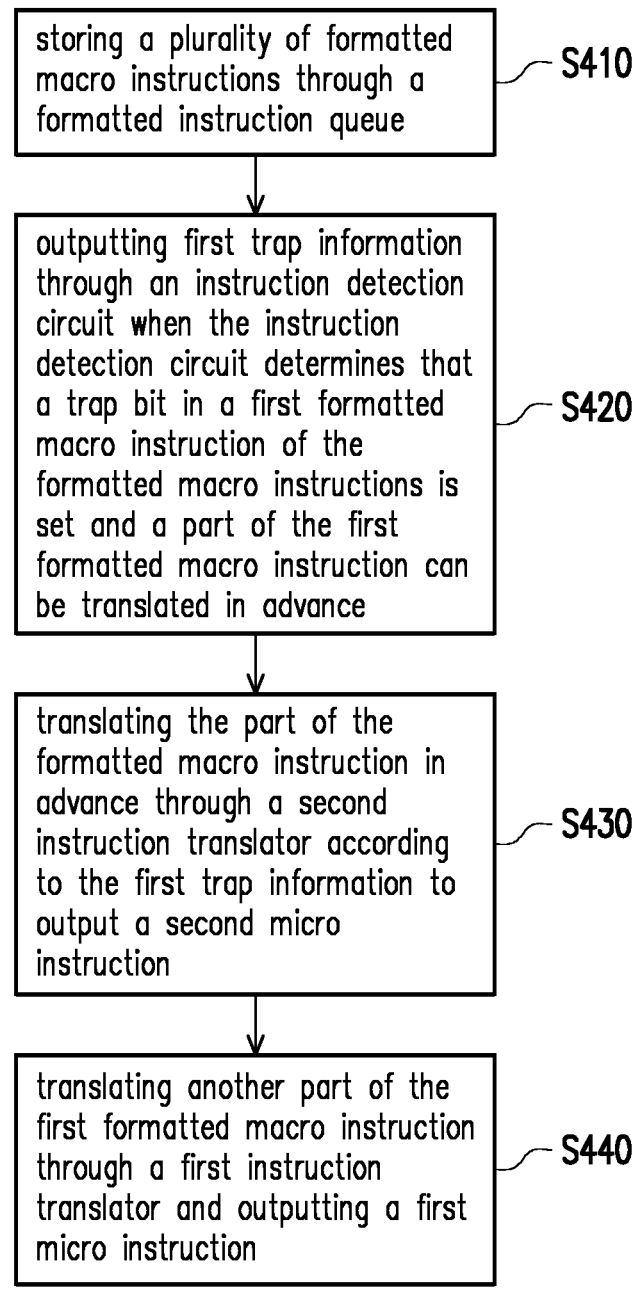
FIG. 3 is a flow chart of an executing method adapted for an instruction translation circuit according to an embodiment of the invention.

FIG. 3 is a flow chart of an executing method adapted for an instruction translation circuit according to an embodiment of the invention. An executing method of this embodiment may be adapted for the instruction translation circuit 100 of FIG. 1 and the instruction translation circuit 200 of FIG. 2. The following flow is described by adopting the instruction translation circuit 100 of FIG. 1. With reference to FIG. 1 and FIG. 3, in step S410, the instruction translation circuit 100 stores a plurality of formatted macro instructions through the formatted instruction queue 110. In step S420, when the instruction detection circuit 130 determines that a trap bit in a first formatted macro instruction of the formatted macro instructions is set and a part of the first formatted macro instruction can be translated in advance, the instruction translation circuit 100 outputs first trap information to the second instruction translator 140 through the instruction detection circuit 130. In step S430, the second instruction translator 140 translates the part of the first formatted macro instruction in advance according to the first trap information to output a second micro instruction. In step S440, the instruction translation circuit 100 translates another part of the first formatted macro instruction through the first instruction translator 120 and outputs a first micro instruction.

That is, in the executing method provided by this embodiment, when processing some formatted macro instructions (e.g., Instr_1 to Instr_3) in sequence, the first instruction translator 120 may detect the rest of the formatted macro instructions which can be translated in advance (e.g., the complex instructions), for example, the first formatted macro instruction Instr_7, in the formatted instruction queue 210 through the instruction detection circuit 130. In this way, instruction translation is performed to the part (the complex part) of the first formatted macro instruction that can be translated in advance through the second instruction translator 140, and the second micro instruction is generated. Not until the first instruction translator 120 processes the first formatted macro instruction Instr_7 and translates the another part (an easier part) of the first formatted macro instruction Instr_7 in sequence does the first instruction translator 120 output the first micro instruction. At that time, the first micro instruction and the second micro instruction could be immediately integrated into the complete micro instruction corresponding to the first formatted macro instruction Instr_7. Therefore, in the executing method provided by this embodiment, the second instruction translator 140 can translate the formatted macro instruction belonging to the complex instruction prior to the first instruction translator 120. In this case, the machine cycle at which the second instruction translator 140 outputs the second micro instruction is earlier than the machine cycle at which the first instruction translator 120 outputs the first micro instruction.

In addition, in this embodiment, people having ordinary skill in the art may acquire sufficient teachings, suggestions, and details related to other technical characteristics and implementation of the instruction translation circuit 100 according to the content of the embodiments of FIG. 1 and FIG. 2, and that detailed descriptions are not further provided hereinafter.

In view of the foregoing, in the instruction translation circuit, the processor circuit, and the executing method thereof, when performing instruction translation, the first instruction translator may detect whether further instruction translation is required to be performed to other formatted macro instructions and detect the formatted macro instruction which can be translated in advance through the second instruction translator. Further, the second instruction translator may temporarily store the micro instruction generated by early translation into the register. After the corresponding formatted macro instruction is translated by the first instruction translator, the register alias table may simultaneously obtain the first micro instruction provided by the first instruction translator and the second micro instruction provided by the second instruction translator owing to early translation. The first micro instruction and the second micro instruction may be integrated into the complete micro instruction corresponding to the formatted macro instruction. That is, the second instruction translator is not required to wait for the first instruction translator and is able to perform instruction translation in advance. Therefore, in the instruction translation circuit, the processor circuit, and the executing method thereof provided by the invention, the speed of instruction translation can be effectively accelerated, and idleness of the second instruction translator is effectively reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An instruction translation circuit, adapted for being disposed in a processor circuit, the instruction translation circuit comprising:
a formatted instruction queue, configured to store a plurality of formatted macro instructions;
a first instruction translator, coupled to the formatted instruction queue, configured to translate a first formatted macro instruction of the formatted macro instructions, and outputting a first micro instruction;
an instruction detection circuit, coupled to the formatted instruction queue, wherein the instruction detection circuit outputs first trap information when the instruction detection circuit determines that a trap bit in the first formatted macro instruction of the formatted macro instructions is set and a part of the first formatted macro instruction can be translated in advance; and
a second instruction translator, coupled to the instruction detection circuit, configured to translate the part of the first formatted macro instruction in advance according to the first trap information to output a second micro instruction,
wherein a machine cycle when the second instruction translator outputs the second micro instruction is earlier than a machine cycle when the first instruction translator outputs the first micro instruction, and the first micro instruction and the second micro instruction are integrated into a complete micro instruction.

2. The instruction translation circuit as claimed in claim 1, wherein the instruction detection circuit determines that the part of the first formatted macro instruction can be translated in advance when the first trap information comprises a trap address or the first formatted macro instruction belongs to a specific instruction type.

3. The instruction translation circuit as claimed in claim 1, further comprising:
a trap bit detector, coupled to the formatted instruction queue, wherein the trap bit detector outputs second trap information when a trap bit in a second formatted macro instruction of the formatted macro instructions is set; and
a multiplexer logic, coupled to the instruction detection circuit and the trap bit detector, configured to receive the first trap information outputted by the instruction detection circuit and the second trap information outputted by the trap bit detector.

4. The instruction translation circuit as claimed in claim 3, wherein when the part of the first formatted macro instruction can be translated in advance, the multiplexer logic determines whether the second instruction translator is in an idle state so as to output the first trap information to the second instruction translator.

5. The instruction translation circuit as claimed in claim 3, wherein the second instruction translator temporarily stores the generated second micro instruction to a register, and the trap bit detector instructs a register alias table to retrieve the second micro instruction from the register when the trap bit detector outputs third trap information according to the first formatted macro instruction and determines that an early trap indication signal corresponding to the first formatted macro instruction is set.

6. The instruction translation circuit as claimed in claim 3, wherein the multiplexer logic determines whether an early trap indication signal corresponding to the second formatted macro instruction is set when the multiplexer logic receives the second trap information,
wherein the multiplexer logic outputs the second trap information to the second instruction translator when the early trap indication signal corresponding to the second formatted macro instruction is not set, so that the second instruction translator generates a third micro instruction according to the second trap information,
wherein the multiplexer logic outputs the first trap information to the second instruction translator when the early trap indication signal corresponding to the second formatted macro instruction is set, so that the second instruction translator generates the second micro instruction according to the first trap information.

7. The instruction translation circuit as claimed in claim 1, wherein the instruction detection circuit comprises:
a finding logic, coupled to the formatted instruction queue and configured to search the formatted macro instructions stored in the formatted instruction queue, so as to point to the first formatted macro instruction, wherein the first formatted macro instruction is the formatted macro instruction who enters the formatted instruction queue earliest among the formatted macro instructions with trap bits being set.

8. The instruction translation circuit as claimed in claim 7, wherein the instruction detection circuit further comprises:
an early trap bit detector, coupled to the formatted instruction queue and configured to detect the first formatted macro instruction pointed to by the finding logic, so as to determine whether the part of the first formatted macro instruction can be translated in advance; and
an early instruction content information generator, coupled to the formatted instruction queue,
wherein the early trap bit detector outputs the first trap information when early trap bit detector determines that the part of the first formatted macro instruction can be translated in advance, and the early instruction content information generator outputs first instruction content information for the second instruction translator to accordingly generate the second micro instruction.

9. The instruction translation circuit as claimed in claim 8, wherein when the early trap bit detector determines that the part of the first formatted macro instruction cannot be translated in advance, the finding logic stops searching the formatted macro instructions stored in the formatted instruction queue so as to be maintained to point to the first formatted macro instruction.

10. A processor circuit, comprising:
an instruction translation circuit, comprising
a formatted instruction queue, configured to store a plurality of formatted macro instructions;
a first instruction translator, coupled to the formatted instruction queue, configured to translate a first formatted macro instruction of the formatted macro instructions, and outputting a first micro instruction;

an instruction detection circuit, coupled to the formatted instruction queue, wherein the instruction detection circuit outputs first trap information when the instruction detection circuit determines that a trap bit in the first formatted macro instruction of the formatted macro instructions is set and a part of the first formatted macro instruction can be translated in advance; and a second instruction translator, coupled to the instruction detection circuit and configured to translate the part of the first formatted macro instruction in advance according to the first trap information to output a second micro instruction; and a register alias table, coupled to the first instruction translator and the second instruction translator, configured to receive the first micro instruction and the second micro instruction, wherein a machine cycle when the second instruction translator outputs the second micro instruction is earlier than a machine cycle when the first instruction translator outputs the first micro instruction, and the first micro instruction and the second micro instruction are integrated into a complete micro instruction.

11. The processor circuit as claimed in claim 10, wherein the instruction detection circuit determines that the part of the first formatted macro instruction can be translated in advance when the first trap information comprises a trap address or the first formatted macro instruction belongs to a specific instruction type.

12. The processor circuit as claimed in claim 10, wherein the instruction translation circuit further comprises:
 a trap bit detector, coupled to the formatted instruction queue, wherein the trap bit detector outputs second trap information when a trap bit in a second formatted macro instruction of the formatted macro instructions is set; and
 a multiplexer logic, coupled to the instruction detection circuit and the trap bit detector and configured to receive the first trap information outputted by the instruction detection circuit and the second trap information outputted by the trap bit detector.

13. The processor circuit as claimed in claim 12, wherein when the part of the first formatted macro instruction can be translated in advance, the multiplexer logic determines whether the second instruction translator is in an idle state, so as to output the first trap information to the second instruction translator.

14. The processor circuit as claimed in claim 12, wherein the second instruction translator temporarily stores the generated second micro instruction to a register, and the trap bit detector instructs the register alias table to retrieve the second micro instruction from the register when the trap bit detector outputs third trap information according to the first formatted macro instruction and determines that an early trap indication signal corresponding to the first formatted macro instruction is set.

15. The processor circuit as claimed in claim 12, wherein the multiplexer logic determines whether an early trap indication signal corresponding to the second formatted macro instruction is set when the multiplexer logic receives the second trap information, wherein the multiplexer logic outputs the second trap information to the second instruction translator when the early trap indication signal corresponding to the second formatted macro instruction is not set, so that the second instruction translator generates a third micro instruction according to the second trap information, wherein the multiplexer logic outputs the first trap information to the second instruction translator when the early trap indication signal corresponding to the second formatted macro instruction is set, so that the second instruction translator generates the second micro instruction according to the first trap information.

16. The processor circuit as claimed in claim 10, wherein the instruction detection circuit comprises:
 a finding logic, coupled to the formatted instruction queue and configured to search the formatted macro instructions stored in the formatted instruction queue, so as to point to the first formatted macro instruction, wherein the first formatted macro instruction is the formatted macro instruction who enters the formatted instruction queue earliest among the formatted macro instructions with trap bits being set.

17. The processor circuit as claimed in claim 16, wherein the instruction detection circuit further comprises:
 an early trap bit detector, coupled to the formatted instruction queue, configured to detect the first formatted macro instruction pointed to by the finding logic, so as to determine whether the part of the first formatted macro instruction can be translated in advance; and
 an early instruction content information generator, coupled to the formatted instruction queue,
 wherein the early trap bit detector outputs the first trap information when early trap bit detector determines that the part of the first formatted macro instruction can be translated in advance, and the early instruction content information generator outputs first instruction content information for the second instruction translator to accordingly generate the second micro instruction,
 wherein when the early trap bit detector determines that the part of the first formatted macro instruction cannot be translated in advance, the finding logic stops searching the formatted macro instructions stored in the formatted instruction queue so as to be maintained to point to the first formatted macro instruction.

18. An executing method, adapted for an instruction translation circuit, the executing method comprising:
 storing a plurality of formatted macro instructions through a formatted instruction queue;
 outputting first trap information through an instruction detection circuit when the instruction detection circuit determines that a trap bit in a first formatted macro instruction of the formatted macro instructions is set and a part of the first formatted macro instruction can be translated in advance;
 translating the part of the formatted macro instruction in advance through a second instruction translator according to the first trap information to output a second micro instruction; and
 translating another part of the first formatted macro instruction through a first instruction translator and outputting a first micro instruction,
 wherein a machine cycle when the second instruction translator outputs the second micro instruction is earlier than a machine cycle when the first instruction translator outputs the first micro instruction, and the first micro instruction and the second micro instruction are integrated into a complete micro instruction.

* * * * *